United States Patent [19]

Hirst

[11] Patent Number: 4,606,640

[45] Date of Patent: Aug. 19, 1986

[54] METHOD AND APPARATUS FOR OPTICALLY TESTING CYLINDRICAL SURFACES

[75] Inventor: George E. Hirst, Irvine, Calif.

[73] Assignee: The Perkin-Elmer Corporation, Norwalk, Conn.

[21] Appl. No.: 595,782

[22] Filed: Apr. 2, 1984

[51] Int. Cl.⁴ .............................................. G01B 9/02
[52] U.S. Cl. ................................. 356/360; 350/162.22
[58] Field of Search ............... 356/354, 355, 356, 359, 356/360; 350/162.20, 162.22

[56] References Cited

PUBLICATIONS

Munnerlyn, "A Simple Laser Interferometer", *Applied Optics*, vol. 8, No. 4, pp. 827–829, Apr. 1969.

Charlot et al., "New 10-μm Infrared Interferometer and Its Applications", *Applied Optics*, vol. 14, No. 4, pp. 890–893, Apr. 1975.

*Primary Examiner*—Davis L. Willis
*Assistant Examiner*—Matthew W. Koren

*Attorney, Agent, or Firm*—Francis L. Masselle; Thomas P. Murphy; Edwin T. Grimes

[57] ABSTRACT

Disclosed is a method and apparatus for optically testing cylindrical surfaces in which a collimated beam of monochromatic light is directed to a variably spaced linear grating which produces two first order cylindrical wavefronts: one, a converging beam in the blaze direction and, two, a diverging beam in an antiblaze direction. The blaze direction beam converges into a line focus. Either a concave or convex cylindrical mirror may be positioned with its axis at that line focus in the appropriate part of the beam to return the rays along their original path to the grating where they interfere with the antiblaze wavefront. By locating a screen of any suitable type in the path of the antiblaze beam, a fringe pattern representing the figure quality of the cylindrical surface under test is formed on the screen. Both concave and convex, coated and uncoated, cylindrical surfaces can be tested by this method and apparatus.

10 Claims, 3 Drawing Figures

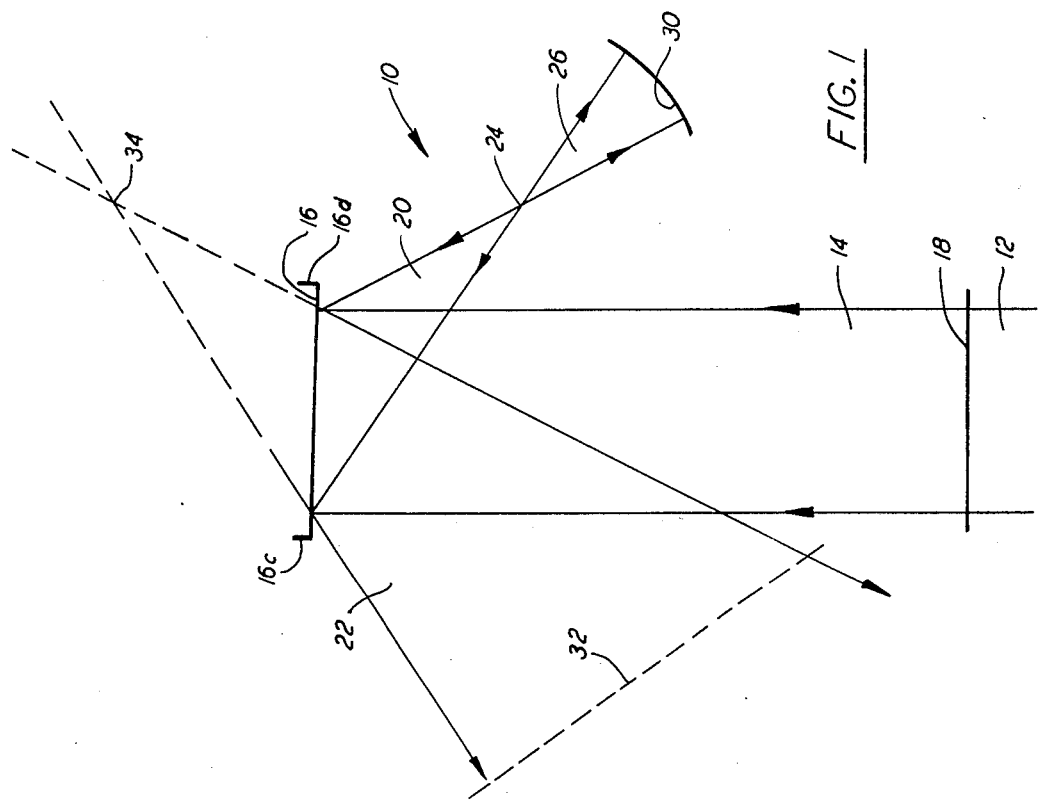
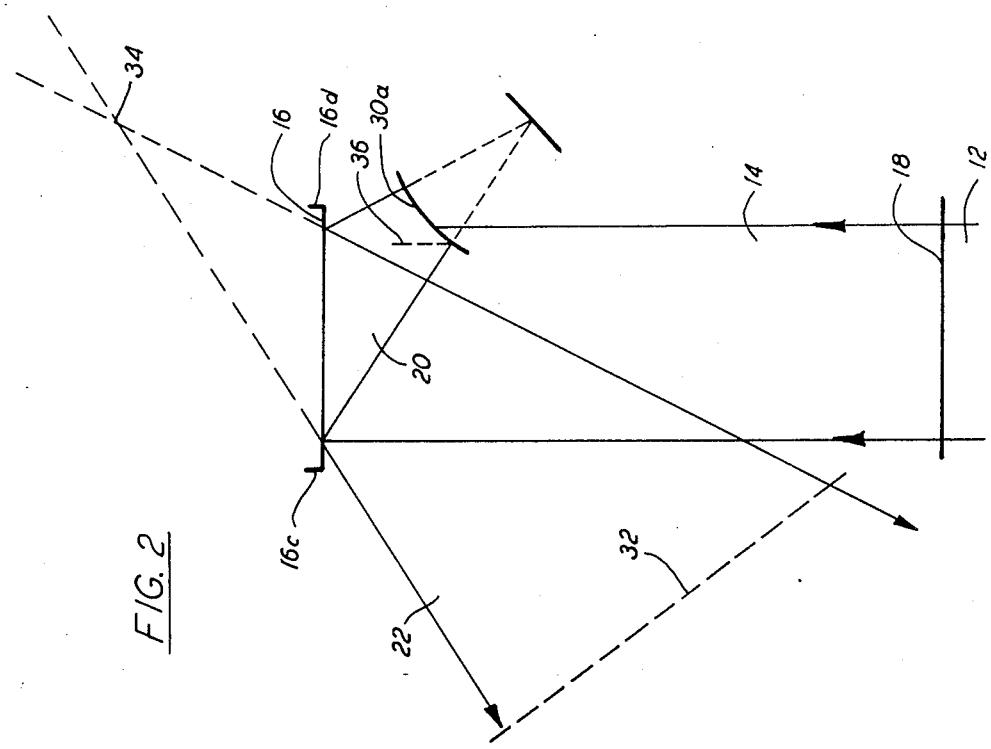

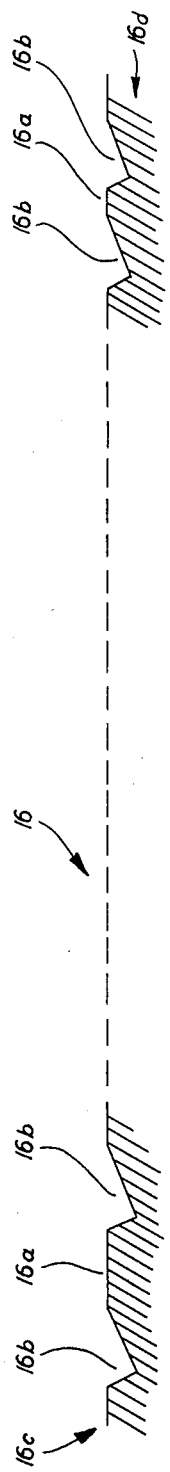

METHOD AND APPARATUS FOR OPTICALLY TESTING CYLINDRICAL SURFACES

BACKGROUND OF THE INVENTION

This invention relates to optically testing the quality of reflective cylindrical surfaces and is specifically directed to a method and an apparatus which is capable of analyzing the entire cylindrical surface of an object under test.

Present day method and apparatus for testing cylindrical surfaces uses test plates made to test the quality of one axis or the other of a cylindrical surface. For example, a relatively narrow spherical test plate can be made which is the standard or gage for judging the cylindrical surface under test. This plate is then placed in contact with the cylindrical surface across its main axis and is moved to various points along the main axis of the cylinder to check optically for errors by forming fringe patterns. In another form of test, the entire surface of a cylindrical test plate is brought into contact with the entire surface of the cylinder under test. Errors in the surface under test will show optically as fringe patterns.

Another possibility for testing cylindrical surfaces is to utilize an output reference cylinder in the path of a collimated beam, such as a laser beam, directed to the cylinder under test. This system is very expensive and limited in wavefront quality and has not been commercially acceptable.

It is an object of this invention to provide an improved method and apparatus for testing cylindrical surfaces which is highly efficient, compact, relatively rugged, inexpensive, and produces an excellent contrast fringe pattern without the use of an external interferometer.

SUMMARY OF THE INVENTION

The method and apparatus which attains the foregoing object comprises a collimated beam of monochromatic light, such as produced by a laser, and beam expander/collimator, directed to a planar, variably-spaced linear grating order having a blazed and an antiblazed order producing cylindrical diffracted wavefronts: one, a converging beam in the blaze direction and, two, a diverging beam in an antiblaze direction. The blaze direction beam converges into a line focus and diverges therebeyond. By placing the axis of a cylindrically surfaced test object, coincident with the line focus, the test object can be made to return the wavefront to the grating where it interferes with the antiblaze wavefront. By locating a screen of any suitable type so as to be impinged by the antiblaze beam and the specular reflection of the returned wavefront, the fringe pattern representing the figure quality of the cylindrical surface under test is formed on the screen. Both concave and convex, coated and uncoated, cylindrical surfaces can be tested by this method and apparatus.

Other and additional advantages of this invention will become apparent to those skilled in the art after a study of the drawings and the following detailed description thereof. For example, by measuring the distance between the line focus of the blaze beam and the test object, the radius of curvature of the cylinder can be determined.

BRIEF DESCRIPTION OF THE DRAWINGS

FIG. 1 illustrates the apparatus of the invention for testing concave cylindrical surfaces;

FIG. 2 illustrates the same apparatus as FIG. 1 except that a convex cylindrical surface is under test; and FIG. 3 illustrates a portion of a diffraction grating in cross-section for practicing this invention.

DETAILED DESCRIPTION

Turning now to FIG. 1 of the drawings, there is disclosed a test apparatus 10 for testing cylindrical surfaces which comprises a source 12 for a collimated monochromatic light (laser) beam 14 which is directed to a diffraction grating 16 aligned perpendicularly to the incident beam. If an optical flat reference output element, such as 18, is used, the zero order return beam from the grating can be used to align the grating 16 perpendicularly to the incident beam 14.

The diffraction grating 16 is a linear grating ruled into a flat surface with variable spaced grooves blazed to produce a high efficiency first order cylindrical converging wavefront 20 in the blaze direction (+1 diffraction) and a first order cylindrical diverging wavefront 22 in the antiblaze direction (−1 diffraction). The wavefront 20 converges into a line focus at 24 then diverges as a cylindrical wavefront 26 to impinge on a test object, such as concave cylindrical surface 30. The cylindrical surface 30, whose axis is made coincident with the line focus 24, will return the wavefront to the grating 16 where another first order diffraction occurs.

This first order diffraction may be returned, as a plane wavefront, to the optical flat reference element 18 of an interferometer for analysis although more energy is lost at the second diffraction and there is a high background of zero order energy which reduces the fringe contrast.

A must better contrast fringe pattern is obtained by placing a screen 32 to intercept the first order antiblaze diffraction (−1) beam 22. This beam diverges from a virtual image 34 and interferes with the returning wavefront from the line focus via a specular (zero order) reflection by the grating surface to generate the fringe pattern on the screen 32 representative of the figure quality of the concave cylindrical surface 30. The screen may be any flat surface which can be viewed from either direction (back or front side of the screen) and used to produce camera interferograms.

Another aspect of the invention is that, while the main axis of the cylinder test object must be coincident with the line focus 24, the distance from the line focus to the cylinder will depend on the curvature of the test surface. It also follows that knowing the distance from the line focus to the cylindrical surface the radius of curvature of the surface can be determined. This can be accomplished by moving the cylinder until its surface is coincident with the line focus and measuring the distance traveled. Detection of a second fringe pattern will signify that the optic is positioned exactly at the line focus.

Additionally, if an optical flat is positioned at the line focus to return the cylindrical wavefront to the grating, then the quality of the diffracted right cylindrical wavefront may be evaluated.

FIG. 2 shows a similar test apparatus in which a convex cylindrical surface 30a may be tested. In this case, however, the convex cylindrical surface 30a is placed ahead of the line focus 24 (not shown) to return the first order wavefront to the diffraction grating. There can be, however, some obscuration of the collimated incident beam by the test object as illustrated at 30a. Since all components, except the convex cylinder 36, in this Figure have the function as similarly numbered components in FIG. 1, further description of the components in this Figure is unnecessary.

To practice this invention, it can be seen that all that is required is a source of monochromatic light, such as a laser, a beam expander/collimator, both readily available on the market, and a diffraction grating. One type of diffraction grating as disclosed, is an optically reflective planar grating having lands (spaces) 16a between the rulings 16b which decrease in width from grid side 16c to the opposite grid side 16d to diffract the collimated beam into a cylindrical wavefront. Typically, the line spacing can vary from 150 lines per millimeter beginning at 16c to 950 lines per millimeter on the opposite side 16d. The grating is designed with a placement of grooves such that the optical path for rays diffracted from adjacent grooves always changes by one wavelength. The spacing across the grating is varied in such a manner as to direct all rays to a common line thereby providing a cylindrical wavefront for testing a right circular cylindrical surface. Obviously, however, the grating for testing right circular cylindrical test optics is more universal since all that is required is to form the line focus to which the main axis of the test optic can be made coincident therewith so that the rays of the beam strike the surface of the test optic normally. In the case of the non-right circular cylindric test surface, the grating must be ruled uniquely to match the returned rays from the test optic so that the focal line or lines can direct the first order rays normal to the test optic surface where they are reflected back along the same path.

The art of computerized ray tracing used to rule the grating is setforth in the text entitled "Modern Optical Engineering" by Warren J. Smith, 1966, McGraw-Hill Inc. (Library of Congress, Card No. 66-18214). See the chapters entitled "Optical Computation" discussing computerized ray tracing and "Stops and Apertures" at page 141 discussing gratings.

In the disclosed method and apparatus, it should be apparent to those skilled in the art, that there is only one diffraction involved so that the efficiency of the apparatus is high and the zero order energy is eliminated from the background which greatly improves the fringe contrast. It also should be apparent that the only equipment required in addition to the equipment listed above are adjustable mounts for the optics to provide a very compact, relatively rugged, and inexpensive system.

What is claimed is:

1. An apparatus for the optical evaluation of the figure quality of a cylindrical surface comprising:
   means generating a planar monochromatic light wavefront;
   a planar, blazed diffraction grating having a blazed order and an anti-blazed order to diffract a first order cylindrical wavefront in the blaze direction;
   a cylindrical surface to be evaluated positioned to return said wavefront to the grating; and
   means located to intercept the first order diffraction cylindrical diverging wavefront from the grating in the anti-blaze direction which interferes with the specular reflected wavefront of the wavefront returned from said cylindrical surface to form fringe patterns on said means to intercept representative of the figure quality of the cylindrical surface.

2. The apparatus as claimed in claim 1 wherein said cylindrical surface is concave.

3. The apparatus as claimed in claim 2 wherein said cylindrical surface is coated.

4. The apparatus as claimed in claim 1 wherein said cylindrical surface is uncoated.

5. The apparatus as claimed in claim 1 wherein the spacing between said grooves varies in such a way as to diffract a right circular wavefront in the blaze and anti-blaze directions.

6. The apparatus as claimed in claim 1 wherein the spacing between said grooves are varies in such a way as to diffract non-right circular wavefronts in the blaze and anti-blaze directions.

7. A method of testing cylindrical surfaces comprising the steps of:
   forming a collimated monochromatic light beam of a selected wavelength;
   providing, in the path of said light beam, a planar, blazed diffraction grating having a blazed and an anti-blazed order, said grating having variably-spaced linear grooves to produce a high efficiency first order cylindrical wavefront which converges into a line focus and diverges as a cylindrical wavefront therebeyond;
   disposing a cylindrical surface to be tested in such a manner that its axis is coincident with the line focus to return the cylindrical wavefront along the same path to the grating;
   disposing a screen relative to said grating to intercept both the first order anti-blaze diffraction from the grating and the specular reflection of the wavefront returned from said cylindrical surface.

8. The method as claimed in claim 7 further including the steps of moving the cylindrical surface under test to a point where its surface is coincident with the line focus and measuring the distance moved to determine the radius of curvature of the surface under test.

9. A method of testing cylindrical surfaces comprising the steps of:
   providing a source of collimated monochromatic light of a selected wavelength which emanates from said source in a flat wavefront:
   providing a variably-spaced linear grating in the path of said collimated light which produces a cylindrical wavefront test beam,
   placing a cylinder to be tested in the path of said test beam so that the latter returns the test beam to the grating, and
   placing a screen on the side of said collimated beam opposite said cylindrical surface being tested to receive the beam diffracted by said grating and the specular reflection of the test beam on which screen fringes are generated representative of the configuration of said cylindrical surface under test.

10. An apparatus for the optical evaluation of the figure quality of a cylindrical surface comprising:
    means generating a planar monochromatic light wavefront;
    a planar, blazed diffraction grating having a blazed and an anti-blazed order defined by grooves shaped and spaced to diffract a first order cylindrical wavefront in the blaze direction which converges in a line focus and diverges into a cylindrical wavefront whose rays strike the cylindrical surface normal thereto and which returns the rays of said wavefront along the same paths; and
    means located to intercept the first order diffraction cylindrical diverging wavefront from the grating in the antiblaze direction which interferes with the specular reflected wavefront of the wavefront returned from said cylindrical surface to form fringe patterns on said means to intercept representative of the figure quality of the cylindrical surface.

* * * * *